March 3, 1953  M. FUNKHOUSER  2,630,193
SHOCK ABSORBER
Filed March 17, 1950

INVENTOR
MEARICK FUNKHOUSER
ATTORNEYS

Patented Mar. 3, 1953

2,630,193

UNITED STATES PATENT OFFICE 2,630,193

SHOCK ABSORBER

Mearick Funkhouser, Dayton, Ohio, assignor to General Motors Corporation, Detroit, Mich., a corporation of Delaware Application March 17, 1950, Serial No. 150,314

10 Claims. (Cl. 188—88)

This invention relates to improvements in direct acting hydraulic shock absorbers.

A direct acting hydraulic shock absorber is one in which the one movable assembly of the device, the piston and its rod, is attached to the one relatively movable member whose movements are to be controlled by the shock absorber, while the other movable assembly of the shock absorber, the cylinder and fluid reservoir, is secured to the other relatively movable member to be controlled. The usual direct acting type hydraulic shock absorber has its piston actuating rod extending from the piston through only one of the two working chambers formed in the cylinder by said piston. This presents the problem of substantial unequal fluid displacement due to the presence of the rod in only one of the working chambers, the other working chamber being completely free of this added displacement element. Where fluid flow restricting passages are provided in the piston for establishing predeterminately restricted fluid flows through said piston in opposite directions as the piston is reciprocated, the shock absorber requires a fluid pressure relief valve in communication with the working chamber not containing the piston rod. An equalizing intake valve is necessary in a shock absorber of this type, the intake valve supplying fluid from the reservoir into the rod free chamber as the piston moves to evacuate the fluid from the rod containing chamber into said rod free chamber.

It is among the objects of the present invention to provide an hydraulic shock absorber of the double, direct acting type in which the fluid replenishment or balance supply from the reservoir, during a cycle of shock absorber operation, is reduced to a minimum, represented substantially by fluid losses resulting from leaks past and through the bearings in which the piston rod portions, extending coaxially from both ends of the piston, are slidably supported.

A further object of the present invention is to provide an hydraulic shock absorber of the double, direct acting type in which all fluid flow restricting valves which control fluid displacement so that the shock absorber offers resistance to movements of the members between which it is suspended, are contained only within or mounted upon the piston. The one end of the cylinder of the shock absorber has a single, one way valve which is operative to permit a substantially unrestricted fluid flow from the reservoir into the cylinder, this flow providing the replenishing or balance supply of fluid to the cylinder.

Further objects and advantages of the present invention will be apparent from the following description, reference being had to the accompanying drawings wherein a preferred embodiment of the present invention is clearly shown.

Figures 1, 2:
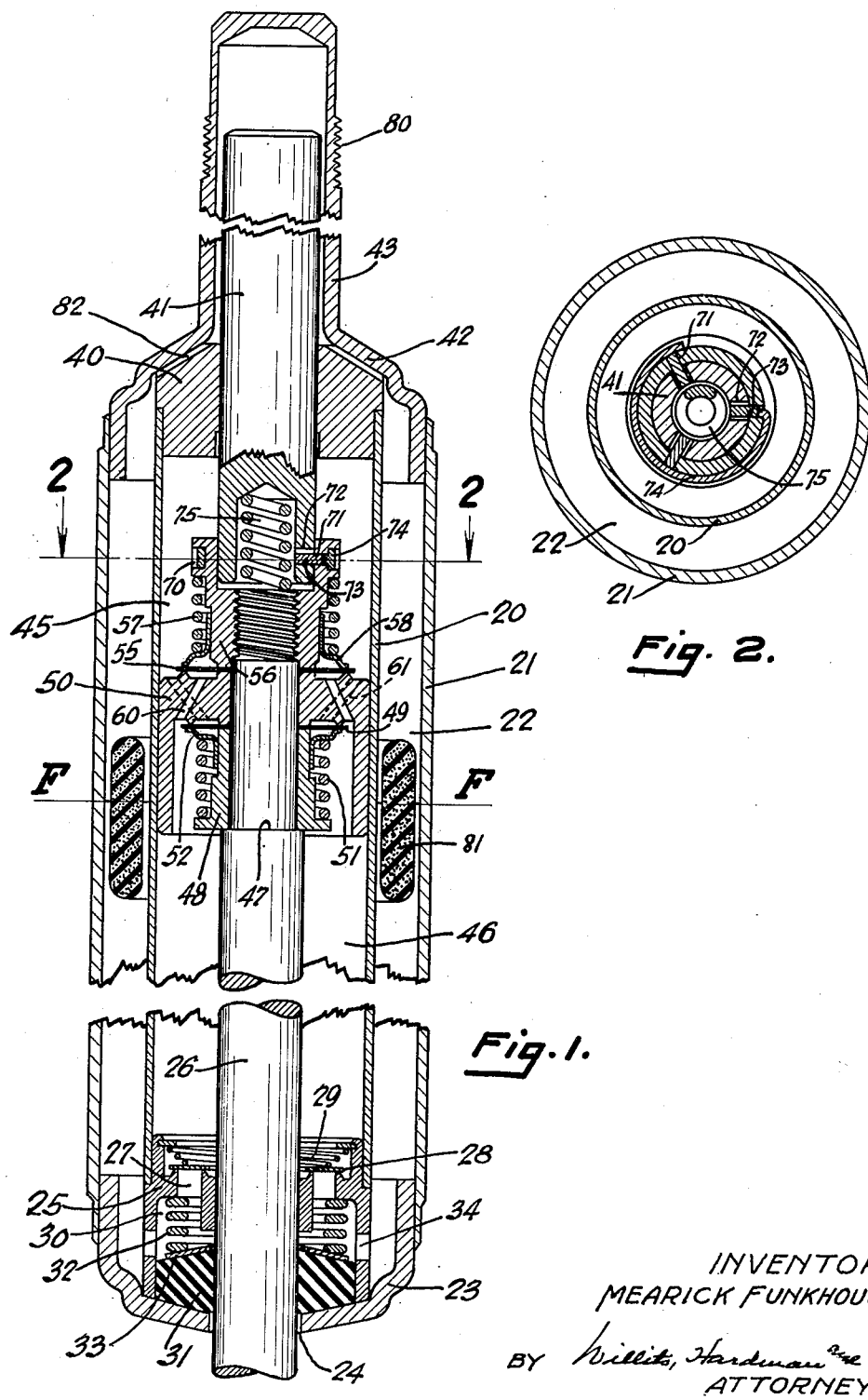
Fig. 1 is a longitudinal sectional view of a direct acting hydraulic shock absorber built in accordance with the present invention, certain parts being shown in elevation for the sake of clearness.
Fig. 2 is a transverse section taken along the line and in the direction of the arrows 2—2 of Fig. 1.

Referring to the drawings the shock absorber is shown having two concentric tubular members, the inner or smaller tube designated by the numeral 20 forming the working cylinder of the shock absorber and the outer, larger diameter tube 21 forming the fluid containing reservoir 22 which surrounds the cylinder 20. At the one end of the reservoir tube 21, the bottom end thereof, there is attached a closure cap 23 having a central aperture 24. The bottom end of the cylinder tube 20 has a head member 25 fitted thereupon, said head member having a cylindrical extension which rests upon the closure cap 23. The head member 25 has a central opening providing a bearing in which the portion 26 of the piston rod is slidably supported. The sliding fit of rod 26 in head 25 is such that a predetermined fluid leakage through the bearing is provided for. This rod also extends through the central opening 24 of the cover cap 23 to the exterior of the shock absorber. A plurality of openings 27, arranged in a circular row, are provided in the cylinder head member 25. These openings 27 are normally closed by a ring-shaped disc valve 28 urged upon the head member 25 by a coil spring 29 anchored to and carried by said member 25.

As shown in Fig. 1 head member 25 provides a chamber 30 within its cylindrical extension with which the openings 27 communicate. This chamber 30, through which rod 26 extends, contains a packing 31 which sealingly surrounds and engages the rod 26, the interior wall surface of the chamber 30 in head member 25 and the cover cap 23. A spring 32 in chamber 30 presses upon a plate 33 resting upon the inner surface of the packing 31, this spring exerting a pressure upon the packing to maintain it in sealing engagement with the rod 26, the inner surface of the end cap 23 and the inner surface of the chamber 30 of said head member. Openings 34 in the cylindrical extension of the head member 25 provide communication between the reservoir 22 and the openings 27 in the head member 25 normally closed by the spring loaded disc valve 28.

The upper end of the cylinder 20 has a plug 40 press-fitted thereon which forms the rod guide at this end of the cylinder. This rod guide is centrally apertured to provide a predeterminately leakable bearing slidably supporting the rod 41 which extends beyond both sides of the rod guide 40. A cover cap 42 is secured to the upper end of the reservoir tube 21, this cover cap 42 resting upon the rod guide 40 and pressing the rod guide 40, the cylinder 20 and the opposite end head member 25 downwardly so that the end of the head member 25 is maintained in seated engagement with the cover cap 23 and thus the two tubular members 20 and 21 are maintained in proper concentric relation. The upper cover cap 42 has a tubular extension 43 closed at its upper end. The inner diameter of this tubular extension is sufficiently large to provide a substantial clearance between the inner surface of said extension and the rod 41 which extends into said tubular extension as shown in the drawing.

The cylinder 20 is divided into two working chambers by the piston therein, the upper working chamber being designated by the numeral 45 and the lower chamber by the numeral 46. The rod 26 is of a predetermined diameter. A portion of the inner end of rod 26 is of lesser diameter, presenting an annular shoulder 47 upon which a collar 48 rests. Surrounding the smaller diameter portion of rod 26 and resting upon the shoulder 47 is a flexible, ring-shaped disc valve 49. Resting upon said disc valve, and mounted upon the smaller diameter portion of the rod 26 is the body portion of the piston 50. The inner surface of the piston 50 has an annular ridge providing a seat which is normally engaged by the disc valve 49, which is urged and yieldably maintained in engagement with said annular ridge or valve seat by a spring 51 interposed between a flange on the collar 48 and an abutment sleeve 52 slidably mounted upon the collar 48 and engaging the flexible disc valve 49. The upper, outer face of the piston has an annular ridge providing a seat normally engaged by the ring-shaped, flexible disc valve 55. A collar 56 is threadedly secured to the inner end of the rod 26 and when tightened clamps upon the flexible disc valve 55 to hold it upon the piston 50 at the same time urging said piston into clamping engagement with the disc valve 49 and it upon the collar 48 and the collar in turn upon the annular shoulder 47 on the rod 26. Thus collar 56 holds the entire piston assembly upon the rod 26. A spring 57, interposed between an annular flange on the sleeve 56 and an abutment collar 58 slidably carried by the sleeve 56, urges said collar upon the flexible disc valve 55 yieldably to maintain it seated upon the annular ridge or valve seat provided on the piston head.

A plurality of through passages are provided in the piston 50 for the purposes of establishing fluid flows through the piston in opposite directions. These passages are arranged in an annular row. Alternate passages designated by the numeral 60 provide communication between the working chamber 46 and the annular space beneath valve 55 and within its annular valve seat. The other alternate passages shown in dotted lines and designated by the numeral 61 provide communication between the annular space provided by the disc valve 49 and its engaged annular valve seat and the working chamber 45. These valve mechanisms are arranged so that when the piston moves downwardly fluid may flow from the working chamber 46 through the passages 60, flexing and lifting the valve 55 to establish a flow into the upper working chamber 45. As the piston moves upwardly or in the opposite direction fluid from chamber 45 will pass through passages 61 exerting pressure upon the disc valve 49 to move it from its seat and establish a flow into the lower or working chamber 46. Both valves 49 and 55 restrict fluid flow through the piston passages thereby causing the shock absorber to offer resistance to relative movements of the elements between which it is secured.

The sleeve 56 acts not only to clamp the various elements of the piston assembly together upon the shaft 26, but it also provides a coupling for securing the rod 41 coaxially to the rod 26. The outer end of sleeve 56 is counter-bored to receive the inner end of the shaft 41 the diameter of which is predeterminately larger than the diameter of the shaft 26. An annular groove 70 is provided in the outer peripheral surface of sleeve 56 adjacent its outer end. Communicating with this annular groove is a plurality of radial openings 71. These openings 71 in the sleeve will align with slightly larger radial openings 72 in the recessed end of the rod 41 extending into sleeve 56, so as to receive locking pins 73 which lock the two rods 41 and 26 together in coaxial alignment. A ring-shaped spring 74 fits into the groove 70 and holds the pins 73 in position and prevents accidental removal thereof. In order to prevent rotation of the spring in the annular groove 70, the end of said spring is turned inwardly so as to extend slightly into one of the radial openings 71 in the sleeve 56. A coil spring 75 is received by the recess in the inner end of rod 41 and engages the end of the shaft 26 threaded to the sleeve 56. This spring 75 urges the two shafts apart so that the pins 73 supported in the radial openings 71 of the sleeve 56 are held in engagement with one side of the slightly larger radial opening 72 in the rod 41 and thereby reducing and substantially eliminating pounding noise between the two shafts 41 and 26 during the operation of the shock absorber as the piston is reciprocated in the cylinder.

The tubular extension 43 of the upper cover cap 42 may be secured to the frame of the vehicle to which the shock absorber is applied, threads 80, provided on said tubular extension, receiving the securing nut which attaches this end of the shock absorber to the frame of the vehicle. The outer end of rod 26 may have any suitable attaching means by which this rod is secured to the axle of the vehicle upon which the shock absorber is assembled. Thus, as in standard applications of shock absorbers of this type to vehicles, this shock absorber may be secured between the relatively movable frame and axle of a vehicle.

Within the reservoir 22 there is provided a ring-shaped damper 81 made of any suitable material not effected by the fluid contained within the reservoir 22 and capable of being buoyantly supported by the liquid in said reservoir so as to float upon the surface F thereof. This damper ring 81 while floating upon the surface F of the fluid in the reservoir substantially eliminates agitation of the fluid during the violent shaking of the shock absorber while in use on a motor vehicle, especially when the vehicle is being operated over a rough roadbed.

Instead of the two separate rods 26 and 41 a one piece rod may be used one portion 26 thereof being of a certain diameter and another portion 41 being of a predeterminately larger diameter than portion 26 and the piston secured to said single rod in any suitable manner adjacent the junction of the two diameter portions.

From the aforegoing it may be seen that the present shock absorber differs from the ordinary standard direct acting type hydraulic shock absorber in that it has a piston rod extending throughout the length of the shock absorber, that is, through both cylinder end heads which slidably support this rod. The chamber 46 with which the intake valve mechanism between the reservoir and cylinder communicates has larger fluid displacement characteristics than the opposite chamber 45 inasmuch as chamber 46 contains the smaller diameter rod portion 26 which in the present design provides the actuator for the piston 50.

During operation of the shock absorber and particularly when the piston moves downwardly due to approaching movements of the frame and axle of the vehicle between which the shock absorber is secured, fluid within the chamber 46 will have pressure exerted thereupon causing the fluid to exert pressure through the piston passages 60 against the flexible disc valve 55 causing said valve to be flexed against the effect of the spring 57 thus establishing a restricted fluid flow from chamber 46 through passages 60 in the piston, past the valve 55 into the chamber 45. Inasmuch as chamber 45 contains the larger diameter piston portion 41, said chamber 45 is not capable of receiving all of the fluid evacuated from chamber 46. The excess fluid will be forced through the predeterminately leakable bearings, slidably supporting the rod portions 41 and 26 into the reservoir 22. During this time therefore chamber 45 will be supercharged inasmuch as the excess fluid displaced from chamber 46 to chamber 45 will be displaced by the predeterminately larger diameter rod portion 41 and, as described, will be forced through the bearings slidably supporting the rod portions. From the interior of the tubular extension 43 this fluid passes through ducts 82, provided in the rod guide 40, to the reservoir 22.

When the piston 50 is moved in the opposite direction in response to separating movements of the frame and axle of the vehicle, pressure is exerted upon the fluid in chamber 45 and through the passages 61 shown in dotted lines in the drawing. This fluid pressure will move valve 49 from its seat upon the piston against the effect of the backing spring 51 thus establishing a restricted fluid flow from the chamber 45 through the piston passages 61 into the lower chamber 46. The amount of fluid evacuated from chamber 45, due to the larger diameter piston portion therein, is not sufficient completely to fill the chamber 46 and thus to compensate for this shortage and so that the chamber 46 will be completely filled in response to this piston movement, the intake valve 28 is provided, which, during this movement of the piston, will be lifted from engagement with the valve seat on the cylinder end closure member 25 thus opening the passages 27 and permitting additional fluid to flow from the fluid reservoir 22 through openings 34 in the end head member into the chamber 30 therein and thence through passages or openings 27 into the chamber 46.

If rod portions 26 and 41 were of identical diameters and fluid due to piston reciprocation would be transferred from chamber 45 to chamber 46 and vice versa, chamber 45 would gradually be starved, that is its fluid supply would gradually be diminished due to a certain amount of leakage past the bearings supporting the rod portions 41 and 26. In such a construction it would be necessary to provide an intake or replenishing valve in this chamber as well as the lower chamber 46 so that additional fluid could be added to compensate for leakages. However, where one rod portion is slightly greater as in the present invention the larger diameter rod portion will cause supercharging of the chamber through which it extends, due to its fluid displacement, thereby eliminating the undesirable condition of starvation as aforedescribed. The present invention therefore eliminates the necessity of an additional intake valve as required where identical diameter rod portions are used and it also eliminates the necessity of an additional pressure relief valve which is provided in the usual shock absorbers having one displacement chamber without any rod extending therethrough.

While the embodiment of the present invention as herein disclosed, constitutes a preferred form, it is to be understood that other forms might be adopted.

What is claimed is as follows:

1. An hydraulic shock absorber comprising in combination, a cylinder having a closure member at each end; a valved piston in the cylinder forming two fluid displacement chambers therein; a rod to which the piston is attached, the portions of the rod extending from opposite ends of the piston being different in diameter, in order to render one chamber of greater fluid displacement than the other, each rod portion extending completely lengthwise through a cylinder displacement chamber and slidably through a closure member respectively; a fluid containing reservoir in communication with the outer side of each closure member, through which fluid passes from both displacement chambers into the reservoir as the piston is moved in one direction in the cylinder; a one way valve connecting the reservoir with the cylinder portion through which the smaller diameter rod portion extends, said valve being operative to permit fluid to flow only from said reservoir into the cylinder as the piston moves in the other direction.

2. An hydraulic shock absorber comprising in combination, a cylinder having a closure member at each end; a valved piston forming two fluid displacement chambers in the cylinder; a rod to which the piston is attached, the portions of the rod extending from opposite ends of the piston being different in diameter so as to render the fluid displacement of one chamber, per unit of piston movement different than the other, each rod portion extending slidably through a closure member respectively, both closure members predeterminately leaking fluid as the piston moves in one direction; a fluid containing reservoir; a one way valve in the one closure member, said valve connecting the reservoir with the cylinder portion through which the smaller diameter rod portion extends, said valve being operative to permit fluid to flow only from said reservoir into the cylinder as the piston moves in the other direction; and fluid conducting means connecting the outer end of the closure member, in which the larger diameter rod portion is slidably supported, with the reservoir.

3. An hydraulic shock absorber comprising in combination, a cylinder having a closure member at each end; a valved piston in the cylinder;

a rod to which the piston is attached, the portions of the rod extending from opposite ends of the piston being different in diameter, each rod portion extending slidably through a closure member respectively; a fluid containing reservoir; a fluid flow passage connecting the reservoir with one end of the cylinder; and fluid conducting means connecting the rod bearings with the reservoir, so as to direct fluid, leaking through the bearings, to the reservoir.

4. An hydraulic shock absorber comprising in combination, a cylinder having a closure member at each end; a valved piston forming two fluid displacement chambers in the cylinder; a rod to which the piston is attached, the portions of the rod extending from opposite ends of the piston being different in diameter to differentiate the fluid displacement of said two chambers per unit of piston movement, each rod portion extending slidably through a closure member respectively through both of which a fluid leak is established as the piston moves in one direction; a fluid containing reservoir; a one way valve connecting the reservoir with the cylinder portion through which the smaller diameter rod portion extends, said valve being operative to permit fluid to flow only from said reservoir into the cylinder as the piston moves in the other direction; and a cap secured to the closure member in which the larger diameter rod is slidably supported, the interior of said cap being in fluid flow communication with both the larger diameter rod support and the reservoir.

5. An hydraulic shock absorber comprising a cylinder having a head member at each end; a piston in the cylinder forming two working chambers therein, said piston being attached to a rod slidably supported by the head members so as to permit a predetermined fluid leak through said members as the piston moves in one direction, the rod portion extending through one working chamber having greater fluid displacement than the rod portion in the other working chamber; valved passages in the piston providing for controlled transfer of fluid between the two working chambers; a fluid reservoir; a valved passage in the head member supporting the rod portion having the lesser fluid displacement, said valved passage connecting the reservoir and cylinder and permitting fluid to flow only from the reservoir into the working chamber through which said rod portion of lesser displacement extends as the piston moves in the other direction; a container secured to the head member supporting the rod portion of greater displacement and encasing this rod portion, the interior of said container being in communication with the fluid reservoir.

6. An hydraulic shock absorber comprising a cylinder provided with a head member at each end; a piston in the cylinder forming two fluid displacement chambers therein; a rod of predetermined diameter slidably extending through one head member into the cylinder and having a reduced diameter portion to which the piston is attached; another rod, larger in diameter than the first mentioned rod, secured to said smaller diameter rod adjacent the piston and slidably extening through the other head member both head members being capable of fluid leaks in response to movement of the piston in one direction; means in the piston providing for the transfer of fluid through the piston in either direction; a fluid reservoir; a housing on said other head member and encasing the larger diameter rod extending from said other head member; means in said other head member connecting the interior of the housing with the reservoir; and a valve in the head member supporting the smaller diameter rod, said valve providing for fluid flow from the reservoir into the cylinder as the piston moves in the other direction.

7. An hydraulic shock absorber comprising a cylinder provided with a head member at each end; a rod of predetermined diameter slidably extending through one head member into the cylinder, this inner end of the rod having a reduced diameter portion forming an annular shoulder on the rod; a piston on this smaller diameter rod portion; a collar threaded to the rod and clamping the piston upon said shoulder rigidly securing the piston to the rod; another rod of larger diameter than the first mentioned rod, slidably extending through the other head member and anchored to the collar; valved passages in the piston providing for controlled flow of fluid through the piston in either direction; a fluid reservoir; a valve in said one head member, operative to permit fluid flow only from the reservoir into the cylinder as the piston moves toward said other head member; a housing supported by said other head member and encasing the larger diameter rod extending from said other head member; and ducts provided by said other head member for connecting the interior of the housing with the reservoir.

8. An hydraulic shock absorber comprising a cylinder having a head member at each end; a rod extending slidably through each head member so as to permit a predetermined fluid leakage therethrough, said rods being coaxial and one of predetermined greater diameter than the other to provide differential fluid displacement means in the cylinder; a coupling securing the adjacent ends of the rods together; a piston in the cylinder, secured to one of the rods by the coupling, said piston having valved fluid flow passages providing for the transfer of fluid through the piston in either direction; a fluid reservoir; a valved passage in the head member supporting the smaller diameter rod and operative to permit fluid flow only from the reservoir into the cylinder as the piston moves away from this head member; a tube surrounding the larger diameter rod extending from the head member supporting it, the outer end of said tube being closed, the other end supported upon the head member, the interior of said tube being in communication with the reservoir by ducts provided by the tube supporting head member.

9. An hydraulic shock absorber comprising a cylinder having a head member at each end thereof; a tube surrounding the cylinder and forming a fluid reservoir, said tube having a centrally apertured end cap secured to its one end upon which the one cylinder end rests, and a completely closed closure member at its other end, said closure member having a tubular extension coaxial of the cylinder and engaging the adjacent cylinder head member to hold the cylinder in the reservoir tube concentric thereof, this engaged cylinder head member providing means connecting the interior of the tubular extension with the reservoir; a piston in the cylinder forming two working chambers therein; a rod of predetermined diameter extending through the end cap and the cylinder head member supported thereon, into the one working chamber and having the piston mounted thereon; a second rod of predetermined greater diameter than the first mentioned rod, slidably supported by the head member engaged by the closure member and extending into both the tubular extension of the closure member and the cylinder; a coupling secured to the first mentioned rod and fastening the piston thereto, said coupling having the second rod attached thereto for securing the two rods together substantially in coaxial alignment; valved passages in the piston, operative to provide controlled fluid flows through the piston in opposite directions in response to piston reciprocation; and a valved passage in the cylinder head member supporting the smaller diameter rod, said passage permitting fluid to flow only from the reservoir into the adjacent working chamber of the cylinder as the piston is moved away from the valved head member.

10. An hydraulic shock absorber comprising a cylinder having a head member at each end; a closed end fluid reservoir; a valved piston forming two fluid displacement chambers in the cylinder, said piston having a rod extending coaxially from each end thereof, the one rod being of a predetermined diameter and slidably extending through the said one head member and providing lesser fluid displacement in the respective chamber through which it extends than the other rod which is of a predetermined diameter larger than the first mentioned rod and slidably extending through the other of said head members, the smaller diameter rod providing the actuator for reciprocating the piston; a closure member for the reservoir, said closure member having a tubular, closed end extension encasing the larger diameter rod portion extending from its supporting head member, the interior of said extension being in communication with the reservoir; and a one way valve in the head member supporting the smaller diameter rod, said valve providing communication between the reservoir and cylinder which permits fluid to flow only from the reservoir into said cylinder.

MEARICK FUNKHOUSER.

REFERENCES CITED

The following references are of record in the file of this patent:

UNITED STATES PATENTS

| Number | Name | Date |
|---|---|---|
| 1,144,530 | De Fernanzo | June 29, 1915 |
| 1,575,973 | Coleman | Mar. 9, 1926 |
| 2,087,426 | Bechereau et al. | July 20, 1937 |
| 2,469,276 | Rossman | May 3, 1949 |